United States Statutory Invention Registration [19]

[11] Reg. Number: H694

Czajkowski, Jr. [43] Published: Oct. 3, 1989

[54] MOVABLE THERMAL AND RADAR VEHICULAR DECOY

[75] Inventor: Edward H. Czajkowski, Jr., Ellicott City, Md.

[73] Assignee: The United States of America as represented by the Secretary of the Army, Washington, D.C.

[21] Appl. No.: 172,533

[22] Filed: Mar. 24, 1988

[51] Int. Cl.[4] ..... H04K 3/00

[52] U.S. Cl. ..... 342/13; 342/9; 342/10

[58] Field of Search ..... 342/5, 9, 10, 13

[56] References Cited

U.S. PATENT DOCUMENTS 3,086,202 4/1963 Hopper et al. .
4,419,669 12/1983 Slager et al. .
4,546,983 10/1985 Rosa .
4,659,089 4/1987 Rosa .

*Primary Examiner*—Thomas H. Tarcza
*Assistant Examiner*—Linda J. Wallace
*Attorney, Agent, or Firm*—Walter R. Baylor; Saul Elbaum; Guy M. Miller

[57] ABSTRACT

The present invention decoy is able to simulate an armored vehicle by providing for both thermal and radar signatures. The thermal signature is actively generated by a plurality of thermal panels located on a platform which is configured to have the same passive millimeter wavelength characteristics of the armored vehicle. Accordingly, a smart munition, when viewing the decoy by means of thermal and radar sensors, would conceive the decoy as an actual target.

1 Claim, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MOVABLE THERMAL AND RADAR VEHICULAR DECOY

RIGHTS OF THE GOVERNMENT

The invention described herein may be manufactured, used, and licensed by or for the United States Government for governmental purposes without the payment to me of any royalty thereon.

FIELD OF THE INVENTION

The present invention relates to a decoy, and particularly to a movable decoy which is capable of misleading thermal and radar sensors on smart munitions.

This application is related to co-pending application Ser. No. 07/172,534, by the same inventor and assigned to the same assignee.

BACKGROUND OF THE INVENTION

Currently a lot of emphasis has been placed on smart munitions which can find targets based on certain emissions, either active or passive, from the targets. Several of the new anti-vehicular, for example armor vehicles, munitions, in honing onto their targets, utilize either thermal or millimeter wave sensors, or a combination of both. Therefore, to protect, or at least to increase the survivability of an armor vehicle such as a tank or an armored personnel carrier, a decoy which could attract or confuse the smart munitions is needed.

Decoys which can emit a thermal signature are known. Examples of this type of decoy are disclosed U.S. Pat. Nos. 4,240,212 to Marshall, et al.; Booth 4,346,901 and Regelson, et al. 3,623,727. In the '212 patent, a technique for simulating the thermal appearance of an object target is disclosed. In the '901 patent, a thermal target which is made from a sheet of resistive material, layers of insulation and screen-like continuous electrodes is taught. Neither of these targets is meant to be used as a movable decoy. In the '727 patent, a thermal decoy to be towed by an aircraft is shown. However, this decoy requires an airframe and a number of components which would render this decoy to be quite expensive. In addition, the '727 decoy is meant only for thermal detection.

Therefore, there exists a need for a simple and economical decoy which can be towed on ground by a vehicle and which can confuse both thermal and radar sensors.

BRIEF DESCRIPTION OF THE PRESENT INVENTION

The present invention provides for a movable decoy which is able to produce signatures in both thermal and millimeter wave, i.e. radar, regions. To accomplish this, a platform having the top surface thereof covered by a layer of energy reflective material is mounted onto a carrier means, for example, a trailer. The platform is shaped so that there is at least a portion which is upraised. A plurality of thermal panels are then placed onto the platform at different portions thereof. These panels are connected by cables or wires to a generator, which is located in the trailer. To independently control the different panels, a controller is used to regulate the current sent to each of the panels. By appropriately setting the controls of the controller, a thermal signature which is representative of an armor vehicle, for example, a certain type of tank, can be achieved. Moreover, since the platform is covered by a layer of energy reflective material, energy directed toward the platform will be reflected thereby. Thus, a millimeter wavelength signature for radar sensors is generated.

Accordingly, the present invention decoy is able to achieve a first objective of producing both thermal and radar signatures representative of a particular target.

The present invention is also able to achieve a second objective of producing an economical and readily repairable decoy.

By being movable, the present invention is able to achieve yet a third objective of providing for a decoy which can be readily towed by a to-be-protected armor vehicle so as to increase the survivability of that vehicle.

The present invention is able to aohieve yet another objective of providing for a target which can confuse incoming airborne smart munitions.

The above-mentioned objects and advantages of the present invention will be more clearly understood when considered in conjunction with the accompanying drawings, in which:

DETAILED DESCRIPTION OF THE INVENTION

Figure 1:
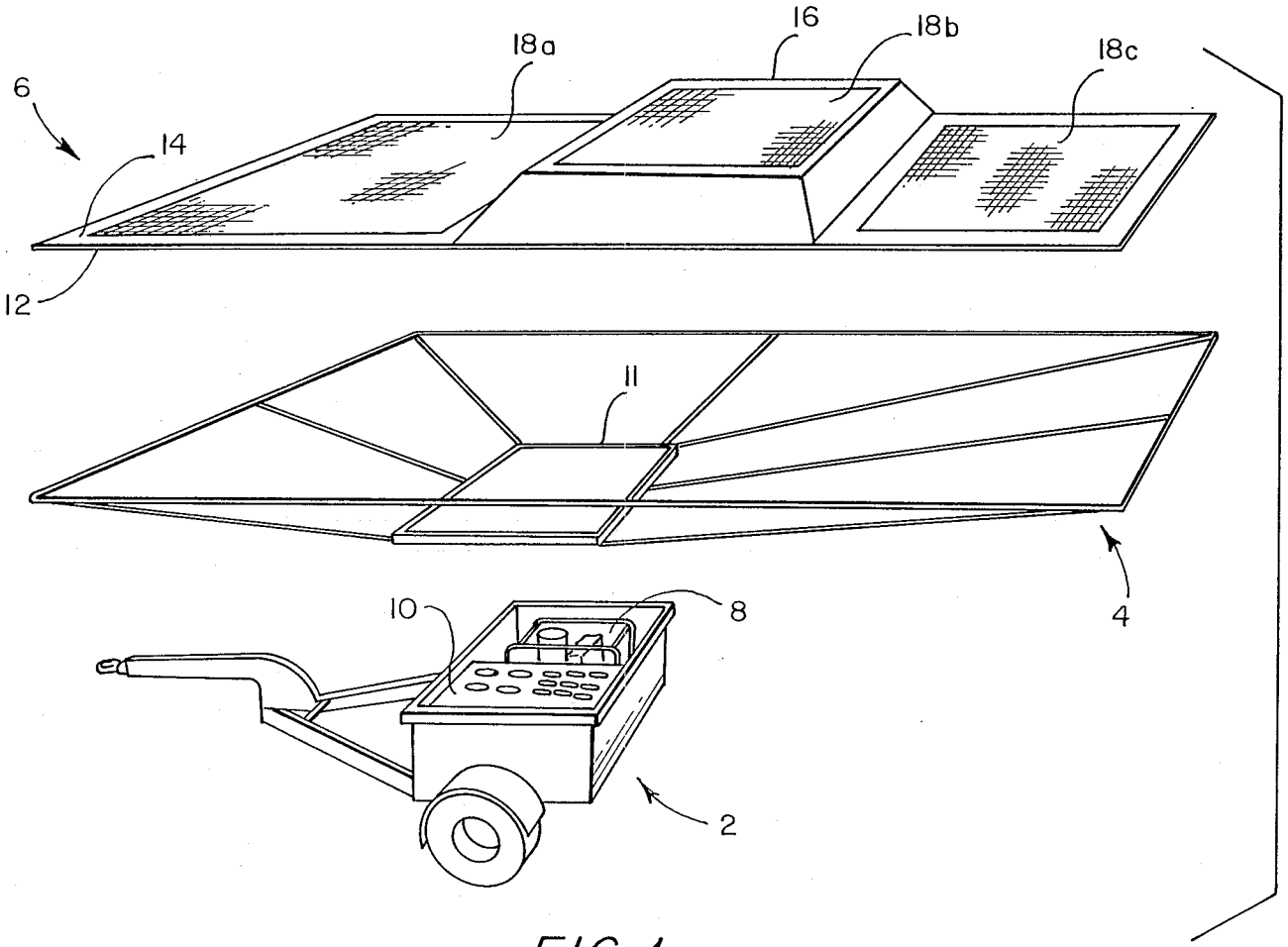
FIG. 1 is a perspective view of the present invention.

The present invention is illustrated in FIG. 1 wherein there is shown a trailer 2, a support frame 4 and a platform 6. Trailer 2 is a conventional type of trailer which has secured therein a generator 8 and a control device 10. The trailer has a conventional type of tongue which allows it to be towed by a vehicle, for example a tank.

Platform 6 is made up of a lightweight substrate 12 which, for example, can be polycarbonate or polystyrene foams. Covering substrate 12 is a sheet of metallic material 14 which, for example, may be aluminum. The combination of substrate 12 and aluminum sheet 14 is well known and oftentimes is referred to in the construction business by the trade name R-Max. As shown, platform 6 has an upraised section 16 which, similarly, is made of R-Max. The dimension of upraised section 16 may vary, depending on what type of vehicle the present invention is meant to act as a decoy. This point will be discussed further hereinbelow. On selected portions of platform 6 are positioned a plurality of thermal panels 18, which, for this embodiment, are designated as 18*a*, 18*b* and 18*c*. It should be appreciated that, although only three thermal panels are shown, a different number of panels, which may vary in size, may also be used.

Essentially, a thermal panel is made up of flexible, electrically insulated top and bottom layers sandwiching a substantially continuous flexible, electrically conductive layer. The amount of heat given off by a thermal panel is proportional to the amount of current fed thereto. This type of thermal panel is made by the TVI Energy Corporation of Beltsville, Md., and is described in detail in Rosa U.S. Pat. Nos. 4,422,646 and 4,546,983.

For the present invention embodiment, each of the thermal panels is connected by means of a cable (not shown) to control device 10, which directs and regulates the amount of power sent from generator 8 to each of the panels. Accordingly, since the amount of heat given off is proportional to the amount of current sent, the panels on platform 6 may have different heat outputs, thereby creating a heat contrast pattern. It should be noted that the thermal panels do not completely cover the top surfaces of platform 6, as various areas of exposed metallic aluminum sheets, for example at 14 and 20, are present.

Interposed between the platform and the trailer is support frame 4, which has a base 11 and a top portion which has the same size as platform 6. Base 11 fits into trailer 2 while the top portion supports platform 6. For this embodiment, support frame 4 is made up of a number of lightweight tubular aluminum members. To ensure that the front portion of the support frame, and therefore platform 6, does not exceed the length of the tongue of trailer 2, support frame 4 is offset to the rear. To provide for rigidity, the top portion of frame 4 is supported to the base by a number of cantilevered members. It should be appreciated that it is not incumbent that tubular aluminum members be used, since other types of lightweight rigid supporting members made up of other materials, such as plastic, may also be used. Likewise, instead of using an R-Max platform, some other type of platform which has similar characteristics as R-Max may also be used. Moreover, even though thermal panels are described for this embodiment, other similar heat-generating means, such as chemically activated panels may also be used.

Figure 2:
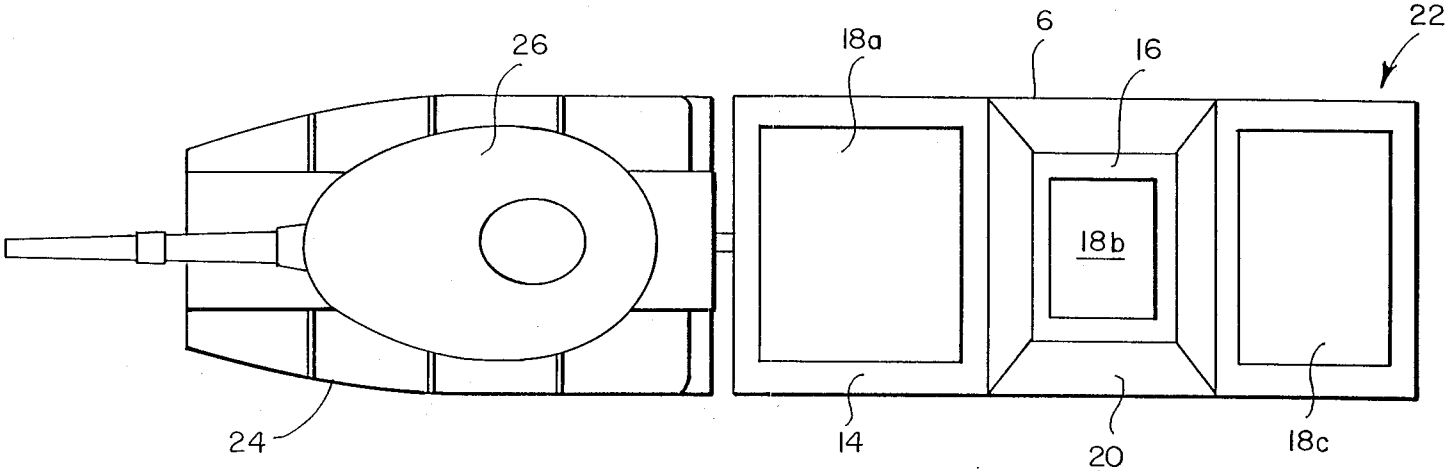
FIG. 2 is a plan view showing an armored vehicle towing the present invention decoy.

In operation, referring to FIG. 2, it can be seen that the present invention decoy, designated 22, is being towed by a tank 24 having a turret 26. For this embodiment, decoy 22, from the plan view, has approximately the same dimensions as tank 24. The tank, by means of its metallic cladding and heat output, gives off active and passive signatures. For example, if a radar is aimed at the tank, the energy emitted therefrom would hit the tank and millimeter waves, i.e. radar waves, will be reflected by the metallic surfaces of the tank back toward the radar. For each type of tank, there is a particular millimeter wavelength signature. Likewise, if a thermal sensor is aimed at the tank, it would tend to pick up from the tank a particular thermal signature, which corresponds to the heat generated by, for example, the engine of the tank. Consequently, if a combination of thermal and radar sensors is used, there is a good probability that a particular type of tank, or for that matter, armored vehicle, may be identified. Currently, certain types of smart munitions do carry both thermal and radar sensors.

The present invention decoy emulates an armored vehicle, for example, tank 24, by providing millimeter wavelength reflective and thermal emissive characteristics approximating those of the tank. As was discussed earlier, the thermal panels are individually controlled and thus the heat generated therefrom may vary. By empirical studies, the panels may be regulated in such a way that the combined heat pattern generated thereby may proximate that given off by a particular armored vehicle. Also by empirical studies, the exposed portions of platform 6 may also be effected to have approximately the same millimeter wavelength reflective characteristics of a particular armored vehicle. For instance, the angles to the sides of upraised section 16, along with the different exposed metallic portions of platform 6, may be arranged in such a fashion that the sum of the arrangement would give off the millimeter wavelength characteristics of tank 24. Thus, the decoy may be employed in different situations.

For a first employment, the decoy may be towed at the back of an existing vehicle, such as a tank or an armor personnel carrier. The decoy arrangement allows for total mobility and performance of the proposed decoy target mission or an armor carrier is on the move. The thermal panels, of course, are activated. Were a smart munition having both radar and thermal sensors aimed at the vehicle, it would pick up the signatures from both the vehicle and the decoy. Since the space between the vehicle and the decoy is negligible, chances are that the sensors would not be able to differentiate the fact that there are two different objects. Consequently, the smart munition may decide that the object is too big and thereby not an object of interest. Alternatively, the smart sensor may decide that, since the object has all the characteristics of the vehicle it is seeking, it will aim and contact it. However, the aim of most smart munitions is at the center of mass of an object. Therefore, the shell of the smart munition may actually end up landing on some part of the vehicle which is not of vital interest, or may even end up hitting the decoy instead, thereby saving the armored vehicle, which is much more expensive, not to mention the possible loss of lives, than the value of the decoy.

A second employment of the decoy may involve the hauling of the decoy to a remote place, or for that matter, a place where armored vehicles are meant to be, and leaving the decoy there. Unless moving targets are particularly being searched, the signatures of the decoy would be close enough to the vehicle so that it will look like a vehicle to the sensors of the smart munition such that the munition would be wasted in what amounts to a very inexpensive item.

The decoy may also be used as a simulated target for testing smart munitions that are being developed, as its signatures can be varied so as to test the effectiveness of the being-developed smart munitions.

Insofar as the present invention decoy is quite inexpensive and can be modified quite readily in terms of the signatures it can actively and passively generate, it provides for a heretofore unavailable decoy.

It should be understood that the invention is not limited to the exact details of construction shown and described herein for obvious modifications will occur to persons skilled in the art.

I claim:

1. A decoy for misleading thermal and radar sensors in search of a target having particular thermal and radar wave reflection signatures, the decoy adapted to be readily towed by a to-be-protected armor vehicle and comprising:

movable trailer means for providing total mobility and performing the proposed decoy target operation during transportability; the movable trailer means including power means and means for controlling the energy supplied by the power means;

a platform positioned above the trailer means;

frame means interposed between the platform and the trailer means for rigidly supporting the platform on the trailer means;

the frame means being a plurality of tubular members cantilevered to a base member for providing air circulation to the power means and to the energy control means;

a platform positioned above the trailer means; the top surface of the platfom being covered by a layer of millimeter radar wave reflective material, the platform having at least one upraised section including a number of substantially vertical surfaces for reflecting radar energy projected thereto;

a plurality of heat generating means positioned on top of the platform at selected portions thereof, the heat generating means including thermal panel means having a heat output corresponding to the amount of current supplied by the power means;

each of the thermal panel means being independently power by the power means via the energy control means;

wherein the plurality of heat generating means produces a contrasting heat pattern substantially representative of the thermal signature of the target;

the heat generating means being powered by the power means, the amount of heat generated by each of the heat generating means being regulated by the energy control means;

wherein the combination of the heat generating means and the platform produces the thermal and radar wave reflection signatures for identifying the decoy as the target to the sensors.

* * * * *